(12) United States Patent
Bowden et al.

(10) Patent No.: US 8,142,030 B2
(45) Date of Patent: Mar. 27, 2012

(54) RECONFIGURABLE CENTER STACK WITH TOUCH SENSING

(75) Inventors: Upton Beall Bowden, Canton, MI (US); Royce Duchante' Channey, Ann Arbor, MI (US); Henry Lee Pope, Redford, MI (US)

(73) Assignee: Visteon Global Technologies, Inc., Van Buren, Township, MI (US)

( * ) Notice: Subject to any disclaimer, the term of this patent is extended or adjusted under 35 U.S.C. 154(b) by 486 days.

(21) Appl. No.: 12/110,407

(22) Filed: Apr. 28, 2008

(65) Prior Publication Data

US 2009/0268163 A1    Oct. 29, 2009

(51) Int. Cl.
G03B 21/14    (2006.01)

(52) U.S. Cl. ............... 353/82; 353/11; 353/12; 353/13; 353/14; 353/15; 353/119; 353/122; 348/837

(58) Field of Classification Search .............. 353/11, 353/12, 13, 14, 15, 119, 122; 345/173, 156, 345/157, 158, 159, 160, 161, 162, 163, 164, 345/165, 166, 167, 168, 169, 170, 171, 172, 345/174, 175, 176, 177, 178, 179, 180, 181, 345/182, 183, 184; 701/36, 1, 29; 296/70, 296/37.8; 348/837
See application file for complete search history.

(56) References Cited

U.S. PATENT DOCUMENTS

| | | | |
|---|---|---|---|
| 5,461,361 A * | 10/1995 | Moore ........................ 340/461 |
| 5,469,298 A * | 11/1995 | Suman et al. ................ 359/630 |
| 5,982,352 A | 11/1999 | Pryor | |
| 6,119,060 A * | 9/2000 | Takayama et al. ............. 701/36 |
| 6,176,534 B1 * | 1/2001 | Duncan ..................... 296/37.12 |
| 6,418,362 B1 | 7/2002 | St. Pierre et al. | |
| 6,652,128 B2 | 11/2003 | Misaras | |
| 6,666,492 B1 * | 12/2003 | Schmidt et al. ................ 296/70 |
| 6,709,041 B1 * | 3/2004 | Hotary et al. .................. 296/70 |
| 7,021,691 B1 * | 4/2006 | Schmidt et al. ................ 296/70 |
| 7,084,859 B1 * | 8/2006 | Pryor ........................... 345/173 |
| 7,131,728 B2 | 11/2006 | Nambudiri et al. | |
| 7,213,926 B2 * | 5/2007 | May et al. ...................... 353/69 |
| 7,889,283 B2 * | 2/2011 | Yoshimi et al. .................. 349/1 |
| 7,972,003 B2 * | 7/2011 | Mori et al. ..................... 353/12 |
| 2002/0036617 A1 | 3/2002 | Pryor | |
| 2005/0064936 A1 | 3/2005 | Pryor | |
| 2005/0276448 A1 | 12/2005 | Pryor | |

(Continued)

FOREIGN PATENT DOCUMENTS

DE    197 30 563 A1    2/1999

(Continued)

OTHER PUBLICATIONS www.forcepaneltechnology.com Copyrighted 2008 InfiniTocgh by QSI Corporation Date of first visit Jan. 30, 2008.

(Continued)

*Primary Examiner* — Georgia Y Epps
*Assistant Examiner* — Sultan Chowdhury
(74) *Attorney, Agent, or Firm* — Fraser Clemens Martin & Miller LLC; J. Douglas Miller

(57) ABSTRACT

A display system for a center stack of a vehicle is disclosed including a translucent material and a projection system. Dynamic graphical content derived from an input by a passenger of the vehicle via at least one of simulated controls and hard-tooled switches is projected onto the material by the projection system.

20 Claims, 2 Drawing Sheets

U.S. PATENT DOCUMENTS

| | | | |
|---|---|---|---|
| 2006/0037794 A1* | 2/2006 | Riha | 180/90 |
| 2006/0202953 A1 | 9/2006 | Pryor et al. | |
| 2006/0267963 A1 | 11/2006 | Pryor | |
| 2006/0279553 A1 | 12/2006 | Soss et al. | |
| 2006/0284856 A1 | 12/2006 | Soss | |
| 2006/0293864 A1 | 12/2006 | Soss | |
| 2007/0156311 A1* | 7/2007 | Elcock et al. | 701/29 |
| 2007/0287093 A1 | 12/2007 | Jing et al. | |
| 2008/0158510 A1* | 7/2008 | Tant et al. | 353/14 |
| 2008/0239242 A1* | 10/2008 | Mori et al. | 353/14 |
| 2009/0024275 A1* | 1/2009 | Hayes et al. | 701/36 |
| 2009/0234529 A1* | 9/2009 | Sampedro Diaz et al. | 701/29 |

FOREIGN PATENT DOCUMENTS

| | | |
|---|---|---|
| DE | 197 51 649 A1 | 5/1999 |
| DE | 101 45 294 A1 | 4/2003 |
| DE | 102 08 636 A1 | 5/2003 |
| DE | 202 10 601 U1 | 11/2003 |
| DE | 10 2004 042 648 A1 | 3/2006 |
| EP | 0 993 995 B2 | 4/2000 |
| FR | 2 824 510 A | 11/2002 |
| JP | 05038968 A | 2/1993 |
| JP | 407257231 | 10/1995 |
| JP | 2993357 B2 | 10/1999 |
| JP | 2007223416 A2 | 9/2007 |

OTHER PUBLICATIONS www.smk.co.jp/product_e/touchpnl_e.html#tp01 Date of first visit Jan. 30, 2008.

www.microvision.com/technology/index.html Copyrighted 2007 Microvision, Inc. Date of first visit Jan. 15, 2008.

* cited by examiner

RECONFIGURABLE CENTER STACK WITH TOUCH SENSING

FIELD OF THE INVENTION

The invention relates to a center stack of a vehicle and more particularly to a display system for a center stack of a vehicle including a translucent material and a projection system.

BACKGROUND OF THE INVENTION

It is well known to provide a center stack between driver and passenger seats in a cockpit of a vehicle. Two essential functions of the center stack are to inform passengers of the general state of the vehicle and to permit passengers to adjust accessories influencing passenger comfort such as temperature and radio volume, for example. Typically, current center stacks include at least one digital display. The digital display is usually a flat, rectangular, thin film transistor (TFT) glass display or a liquid crystal display (LCD). Optionally, the display can include a touch screen overlay or can be controlled by a large number of switches.

One such display is disclosed in U.S. Pat. No. 7,084,859 entitled PROGRAMMABLE TACTILE TOUCH SCREEN DISPLAYS AND MAN-MACHINE INTERFACES FOR IMPROVED VEHICLE INSTRUMENTATION AND TELEMATICS, hereby incorporated herein by reference in its entirety. The display is disposed in an instrument panel center stack. Computer data including knob selection and adjustment functions are projected onto the display by a rear projector. The display may also include knobs mounted thereon, which can provide tactile feedback to a user. Accordingly, the display saves space on the dashboard by reducing the number of knobs required and by sharing the display area between the computer data and the knobs. However, the display is substantially planar, and therefore limits the design flexibility of the center stack.

Various other displays attempt to achieve design flexibility by utilizing translucent materials, for example.

In JP 2007-223416 entitled VEHICULAR INSTRUMENT PANEL hereby incorporated herein by reference in its entirety, a vehicle instrument panel is disclosed. The vehicle instrument panel utilizes a translucent screen. A projector projects a selection of buttons for various vehicle systems such as a navigation system, a heating, ventilating and air conditioning system, and sound system, for example, onto a back side of the translucent material. The buttons are visible on a front side of the translucent material and operational by a passenger of the vehicle. A camera disposed behind the translucent material visually detects an actuation of the buttons. However, the camera occupies valuable space behind the instrument panel.

Although the aforementioned displays operate effectively, the displays are expensive, available in limited sizes, susceptible to external damage, and significantly reduce styling flexibility. Furthermore, an image shown on the display may washout in bright ambient light conditions.

Accordingly, it would be desirable to produce a center stack having a display system including a translucent material and a projection system, wherein design flexibility is maximized and a cost and complexity thereof are minimized.

SUMMARY OF THE INVENTION

In concordance and agreement with the present invention, a center stack having a display system including a translucent material and a projection system, wherein design flexibility is maximized and a cost and complexity thereof are minimized, has surprisingly been discovered.

In one embodiment, the display system for a vehicle center stack comprises a substantially pliable translucent material disposed on a main body of a vehicle center stack, the material having a first surface and a second surface; a projection system adapted to project a light beam containing graphical content onto the second surface of the translucent material, wherein the graphical content is visible on the first surface of the material; and at least one manipulable input device in electrical communication with the projection system.

In another embodiment, the vehicle center stack comprises a main body; and a display system disposed in the main body, the display system further including: a substantially pliable translucent material disposed on the main body, the translucent material having a first surface and a second surface; a projection system adapted to project a light beam containing graphical content onto the second surface of the translucent material, wherein the graphical content is visible on the first surface of the material; and at least one manipulable input device in electrical communication with the projection system, wherein the at least one manipulable input device is at least one of a switch and an touch grid.

In another embodiment, the vehicle center stack comprises a main body; and a display system disposed in the main body and adapted to provide sensory feedback, the display system further including: a substantially pliable translucent material disposed on the main body, the translucent material having a first surface and a second surface; at least one actuator disposed adjacent the translucent material to provide tactile feedback; a projection system adapted to project a light beam containing graphical content onto the second surface of the translucent material, wherein the graphical content is visible on the first surface of the material; and at least one manipulable input device in electrical communication with the projection system, wherein the at least one manipulable input device is at least one of a switch and a substantially pliable transparent touch grid.

BRIEF DESCRIPTION OF THE DRAWINGS

The above and other objects and advantages of the invention will become readily apparent to those skilled in the art from reading the following detailed description of the invention when considered in the light of the accompanying drawings, in which.

DETAILED DESCRIPTION OF THE PREFERRED EMBODIMENTS OF THE INVENTION

The following detailed description and appended drawings describe and illustrate various exemplary embodiments of the present invention. The description and drawings serve to enable one skilled in the art to make and use the invention, and are not intended to limit the scope of the invention in any manner. It is understood that materials other than those described can be used without departing from the scope and spirit of the invention.

Figure 1:
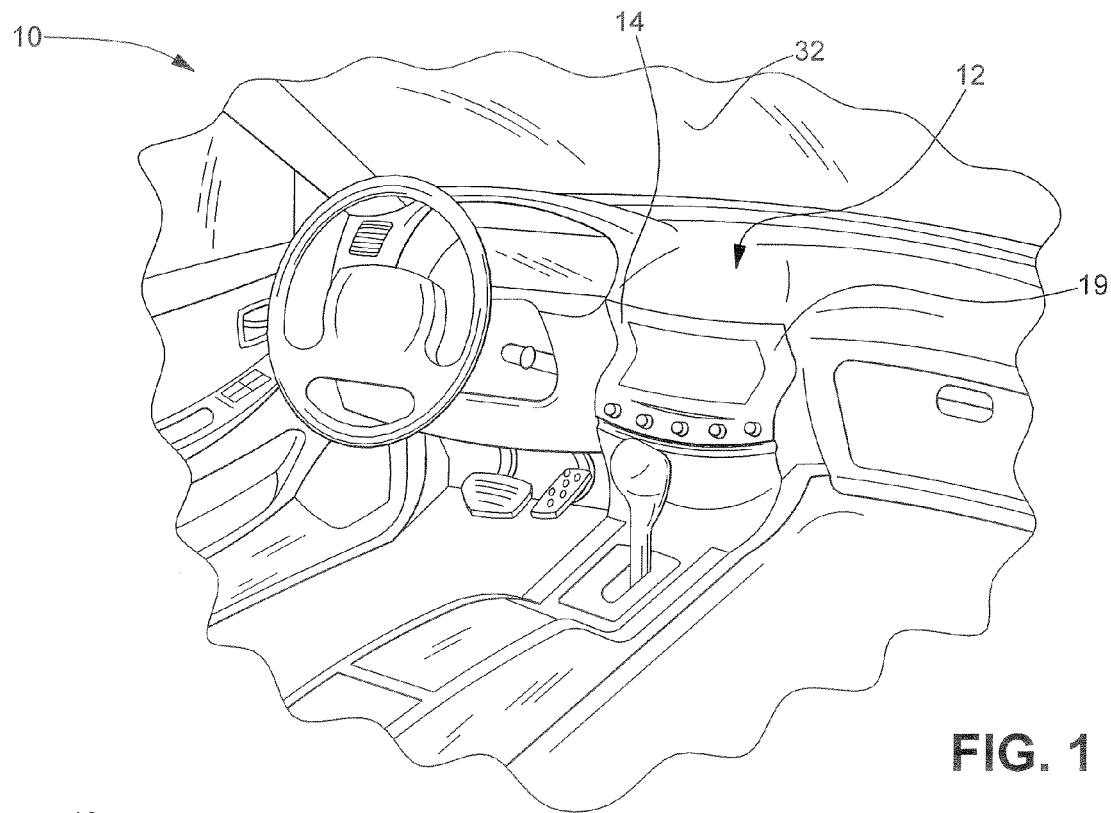
FIG. 1 is a fragmentary perspective view of a vehicle cockpit including a center stack according to an embodiment of the invention.
Figure 2:
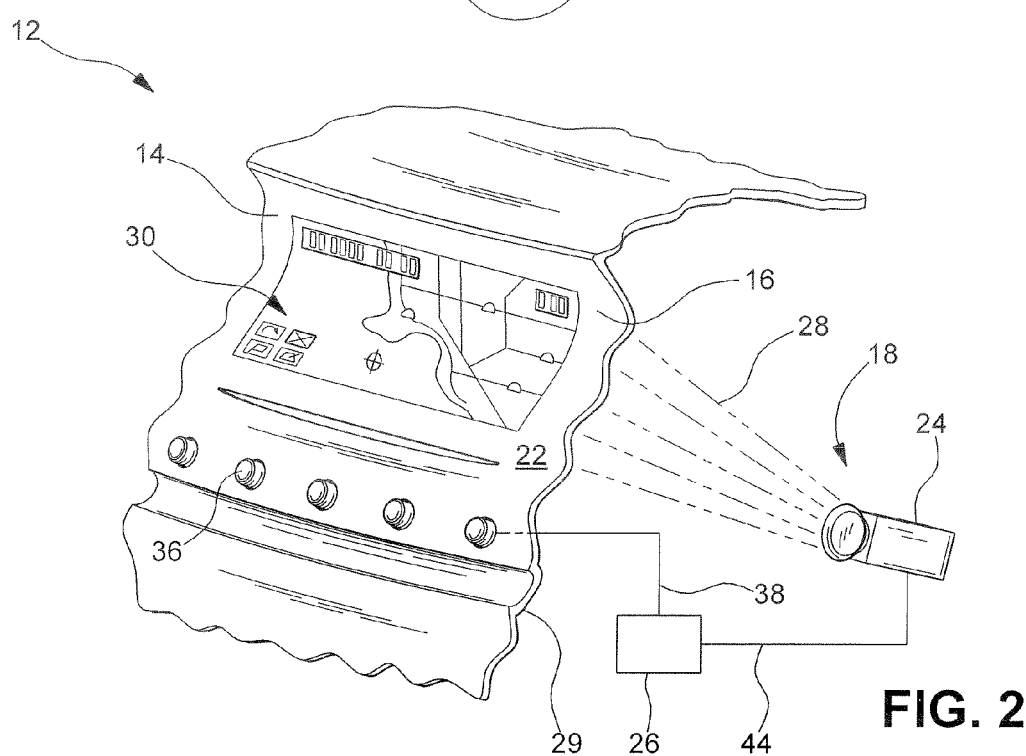
FIG. 2 is a fragmentary perspective view of the center stack illustrated in FIG. 1.

FIG. 1 shows a vehicle cockpit 10 including a center stack 12 having a display system 14 according to an embodiment of the invention. As shown in FIG. 2, the display system 14 includes a translucent material 16 and a projection system 18. The material 16 is adapted to emulate conventional cockpit material as is known in the art when the projection system 18 is not in operation. The material 16 is disposed on a main body 19 of the center stack 12. A first surface 22 of the material 16 may include various patterns and textures such as a granulated texture, a grooved texture, and a ribbed texture, for example. The material 16 can be produced by slush molding, thermoforming, or spraying a thermoplastic material such as vinyl polychloride and polyurethane, for example. It is understood that the material 16 can be produced by other methods and from other materials as desired.

Figure 3:
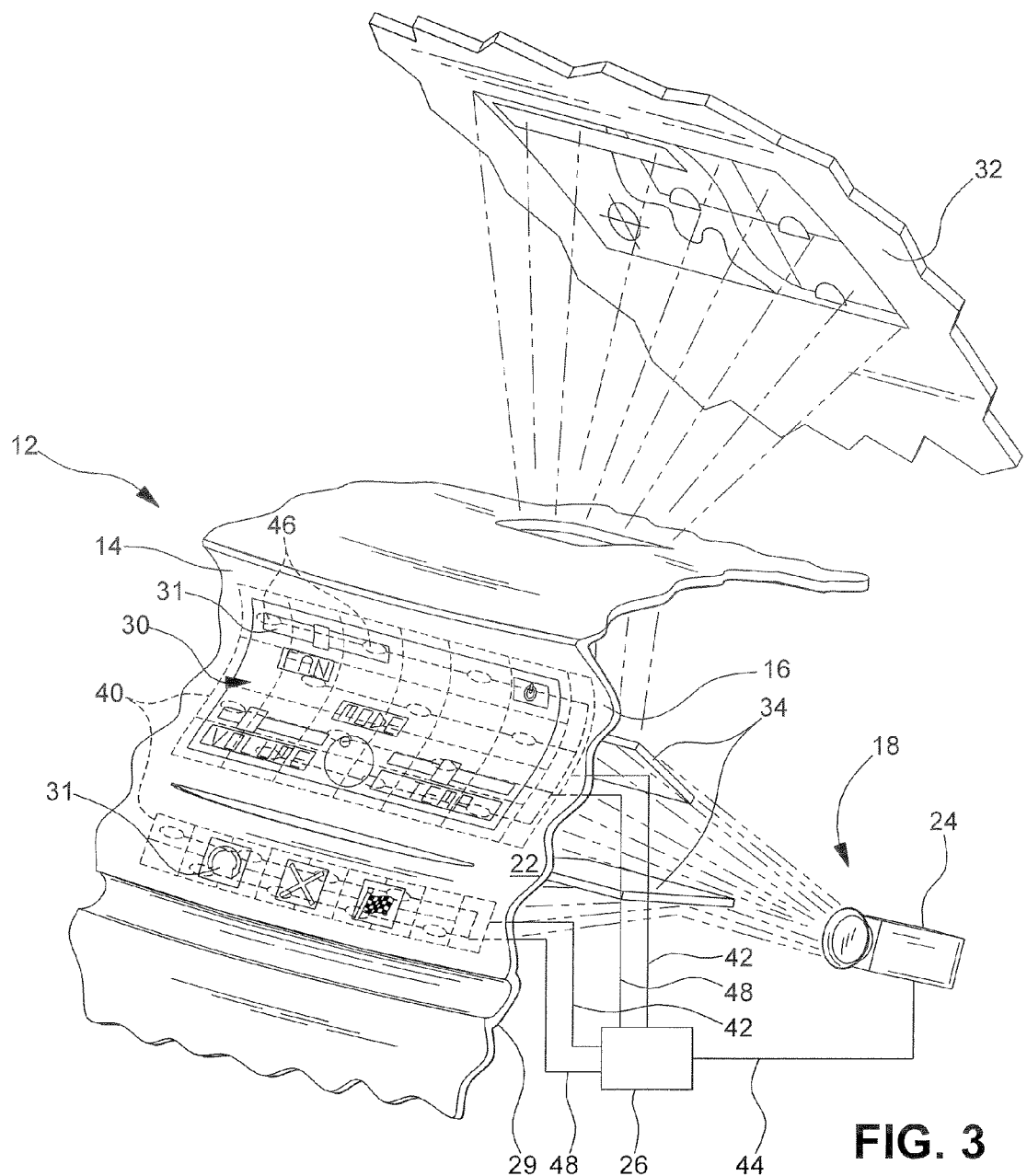
FIG. 3 is a fragmentary perspective view of a center stack according to another embodiment of the invention.

As illustrated in FIGS. 2 and 3, the projection system 18 includes a projector 24 and a controller 26. Additional controllers 26 may be employed as desired. Although the projector 24 and the controller 26 shown are separate, it is understood that the controller 26 can be integral with the projector 24 if desired. The projector 24 shown is a full color laser projector such as that manufactured by Microvision™, although it is understood that other projectors can be employed. The projector 24 is adapted to project a light beam 28 containing graphical content 30 onto a second surface 29 of the material 16. The graphical content 30 can include images, text, simulated controls 31 such as slides, knobs, and pushbuttons, for example, and the like. It is understood that the graphical content 30 can be custom tailored for individual passengers and different trim levels of the vehicle. The material 16 is translucent to permit the graphical content 30 to be clearly visible to a passenger of the vehicle. It is understood that the light beam 28 from the projector 24 can be divided into multiple beams and projected to various locations in the vehicle cockpit, as shown in FIG. 3, such as a windshield 32 of the vehicle (commonly referred to as a heads-up display (HUD)), an instrument panel, a rear view mirror, multiple locations in the center stack 12, and a passenger seat entertainment zone, for example. In the embodiment shown, the light beam 28 is divided and deflected mechanically by at least one mirror 34, although it is understood that the light beam 28 can be divided by other mechanical, electro-mechanical, and electrical methods such as by software in the controller 26, for example.

The display system 14 further includes at least one manipulable input device such as a switch 36 as shown in FIG. 2, a touch grid 40 as shown in FIG. 3, and other manually manipulable input devices, for example. It is understood that the manipulable input device does not visually detect input from the passenger. In the embodiment shown, the input device is disposed in the center stack 12, although it is understood that the input device can be disposed elsewhere in the vehicle cockpit 10 as desired.

The switch 36 is adapted to receive input from the passenger of the vehicle. The at least one switch 36 is in electrical communication 38 with the controller 26 and transmits a signal thereto. As illustrated in FIG. 3, the touch grid 40 is disposed adjacent the inner surface of the material 16. Examples of such touch grid 40 are manufactured by Infini-Touch™ and SMK Corporation. In the embodiment shown, the touch grid 40 is produced from a substantially pliable transparent material to conform to a shape and configuration of the center stack 12 and permit the light beam 28 to pass through onto the second surface 29 of the material 16. It is understood that the touch grid 40 can be produced from other materials if desired. The touch grid 40 is adapted to receive input from the passenger of the vehicle. The passenger can provide the input to the touch grid 40 by contacting and applying a force to the material 16. In the embodiment shown, the passenger can control various systems of the vehicle such as a heating, ventilating, and air conditioning system, a radio, and a navigation system, for example, by contacting the images, text, or simulated controls 31. The touch grid 40 is in electrical communication 42 with the controller 26 and transmits a signal thereto. The controller 26 is adapted to process the signals in one or more ways for one or more purposes such as to process a signal to increase a fan speed of the heating, ventilating, and air conditioning system by only transmitting a processed signal thereto, or to process the signal to increase the fan speed by sending a processed signal to the heating, ventilating, and air conditioning system and a processed signal to the radio system increasing a radio volume to compensate for an increase in fan noise, for example.

The controller 26 is also in electrical communication 44 with the projector 24. The projector 24 is adapted to receive a processed signal from the controller 26, causing the graphical content 30 to be modified accordingly. The display system 14 can also be adapted to provide input acknowledgment to the passenger such as an audible, a visual, and a tactile feedback, for example. In the embodiment shown in FIG. 3, the display system 14 includes at least one actuator 46 to provide a vibration sensation to the passenger of the vehicle in response to input received therefrom. The at least one actuator 46 is in electrical communication 48 with the controller 26.

In use, the passenger of the vehicle provides input to the display system 14 by actuating at least one of the switches 36 or the touch grid 40. The touch grid 40 is actuated by the passenger contacting the graphical content 30 displayed on the material 16 and applying a force upon the material 16 and the touch grid 40. Based upon the input, the passenger receives at least one of an audible, a visual, and a tactile feedback. The switches 36 and the touch grid 40 transmit signals derived from the input to the projection system 18. The projection system 18 processes the signals and, accordingly, changes the graphical content 30 displayed. Other actions such as energization of a ventilation fan or other vehicle components can be accomplished as desired.

An advantage of the above invention is the capability of producing a highly stylized vehicle cockpit which is not constrained by the necessity to provide a flat surface for a display system or hard-tooled controls.

From the foregoing description, one ordinarily skilled in the art can easily ascertain the essential characteristics of this invention and, without departing from the spirit and scope thereof, can make various changes and modifications to the invention to adapt it to various usages and conditions in accordance with the scope of the appended claims.

What is claimed is:

1. A vehicle center stack comprising:
   a main body; and
   a display system disposed in the main body, the display system further including:
   a substantially pliable translucent material fixedly attached to a main body of a vehicle center stack which conforms to a shape and configuration of the main body to form a portion of the vehicle center stack, the material having a first surface and a second surface;
   a projection system including a projector adapted to project a light beam containing graphical content, wherein the light beam is divided into at least a first portion and a second portion, the first portion of the light beam projected to a first location and the second portion of the light beam projected to a separate second location, wherein the first portion of the light beam is projected onto the second surface of the translucent material and the graphical content of the first portion of the light beam is visible on the first surface of the material.

2. The center stack according to claim 1, wherein the translucent material includes at least one of a pattern and a texture which emulates a material used to produce another portion of the vehicle center stack when the projection system is not in operation.

3. The center stack according to claim 1, wherein the projector of the projection system is a full color laser projector.

4. The center stack according to claim 1, wherein the at least one manipulable input device is at least one of a switch and a touch grid disposed adjacent the second surface of the translucent material.

5. The center stack according to claim 1, further comprising at least one actuator disposed adjacent the translucent material to provide tactile feedback.

6. A vehicle center stack comprising:
a main body; and
a display system disposed in the main body, the display system further including:
a substantially pliable translucent material fixedly attached to the main body which conforms to a shape and configuration of the main body to form a portion of the vehicle center stack, the translucent material having a first surface and a second surface;
a projection system adapted to project a light beam containing graphical content onto the second surface of the translucent material, wherein the graphical content is visible on the first surface of the material when the projection system is in operation, and wherein the first surface of the material emulates a material used to produce another portion of the vehicle center stack when the projection system is not in operation; and
at least one manipulable input device in electrical communication with the projection system, wherein the at least one manipulable input device is at least one of a switch and a touch grid.

7. The center stack according to claim 6, wherein the display system is adapted to provide sensory feedback.

8. The center stack according to claim 6, wherein the translucent material is produced from a pliable plastic material having at least one of a pattern and a texture formed therein.

9. The center stack according to claim 6, wherein the display system further includes at least one actuator disposed adjacent the translucent material to provide tactile feedback.

10. The center stack according to claim 6, wherein the touch grid is produced from a substantially transparent material.

11. The center stack according to claim 6, wherein the touch grid is produced from a substantially pliable material.

12. A vehicle center stack comprising:
a main body; and
a display system disposed in the main body, the display system further including:
a substantially pliable translucent material fixedly attached to the main body which conforms to a shape and configuration of the main body to form a portion of the vehicle center stack, the translucent material having a first surface and a second surface;
a projection system including a projector adapted to project a light beam containing graphical content, wherein the light beam is divided into at least a first portion containing a first portion of the graphical content and a second portion containing a second portion of the graphical content, the first portion of the light beam projected to a first location and the second portion of the light beam projected to a separate second location, wherein the first portion of the graphical content of the first portion of the light beam is projected onto the second surface of the translucent material and the first portion of the graphical content is visible on the first surface of the material.

13. The center stack according to claim 12, wherein the display system provides sensory feedback.

14. The center stack according to claim 12, wherein the translucent material is produced from a pliable plastic material having at least one of a pattern and a texture formed therein which emulates a material used to produce another portion of the vehicle center stack when the projection system is not in operation.

15. The center stack according to claim 1, wherein the first portion of the light beam includes a first portion of the graphical content and the second portion of the light beam includes a second portion of the graphical content.

16. The center stack according to claim 15, wherein the first portion of the graphical content is different from the second portion of the graphical content.

17. The center stack according to claim 1, wherein the second location is at least one of a windshield, an instrument panel, a rear view mirror, the center stack, and a passenger seat entertainment zone.

18. The center stack according to claim 12, further comprising at least one manipulable input device in electrical communication with the projection system, wherein the at least one manipulable input device is at least one of a switch and a touch grid.

19. The center stack according to claim 12, wherein the first portion of the graphical content is different from the second portion of the graphical content.

20. The center stack according to claim 12, wherein the second location is at least one of a windshield, an instrument panel, a rear view mirror, the vehicle center stack, and a passenger seat entertainment zone.

* * * * *